United States Patent [19]

Lenhart

[11] Patent Number: 5,611,648
[45] Date of Patent: Mar. 18, 1997

[54] AIR CONVEYING SUPPORT STRUCTURE FOR CONVEYING ARTICLES ALONG AN AIR CONVEYOR

[75] Inventor: Ronald A. Lenhart, Lakewood, Colo.

[73] Assignee: Simplimatic Engineering Company, Lynchburg, Va.

[21] Appl. No.: 592,216

[22] Filed: Jan. 26, 1996

[51] Int. Cl.⁶ ................................................. B65G 51/03
[52] U.S. Cl. ............................................................ 406/88
[58] Field of Search ........................... 406/86, 88; 226/7, 226/97; 34/432, 576, 579, 580, 581, 582, 583, 584, 585

[56] References Cited

U.S. PATENT DOCUMENTS

| | | | |
|---|---|---|---|
| 3,475,058 | 10/1969 | Sanders | 406/88 |
| 4,165,132 | 8/1979 | Hassan et al. | 406/10 |
| 4,730,955 | 3/1988 | Lenhart | 406/88 |
| 4,744,702 | 5/1988 | Wiseman et al. | 406/88 |
| 5,222,840 | 6/1993 | Ingraham et al. | 406/88 |
| 5,466,096 | 11/1995 | Hilbish et al. | 406/84 |

*Primary Examiner*—Andrew C. Pike
*Attorney, Agent, or Firm*—Fields & Johnson, P.C.

[57] ABSTRACT

A deck plate support structure for an air conveyor includes two major structural members; namely, an upper support member and a lower support member. The upper and lower support members are positioned below the deck plate of the air conveyor and are secured to the underside thereof. The lower support members are connected to flanges or other connecting structure of the plenum assembly. The upper support members are channel-shaped structures which attach to corresponding lower support members. A plurality of fasteners attached to the underside of the deck plate pass through slots in the upper support members and holes in the lower support members enabling the entire deck plate support structure to be attached to the underside of the deck plate. The lower support members include a plurality of openings to allow free passage of pressurized air within the plenum assembly to flow unimpeded through louvers positioned thereover. The passageways created through the upper support members also allows pressurized air within the plenum assembly to flow unimpeded through the louvers positioned thereover. The arrangement of the lower support members with respect to the upper support members is infinitely variable which enables the deck plate support structure to accommodate the support needs of differing types of air conveyors.

15 Claims, 3 Drawing Sheets

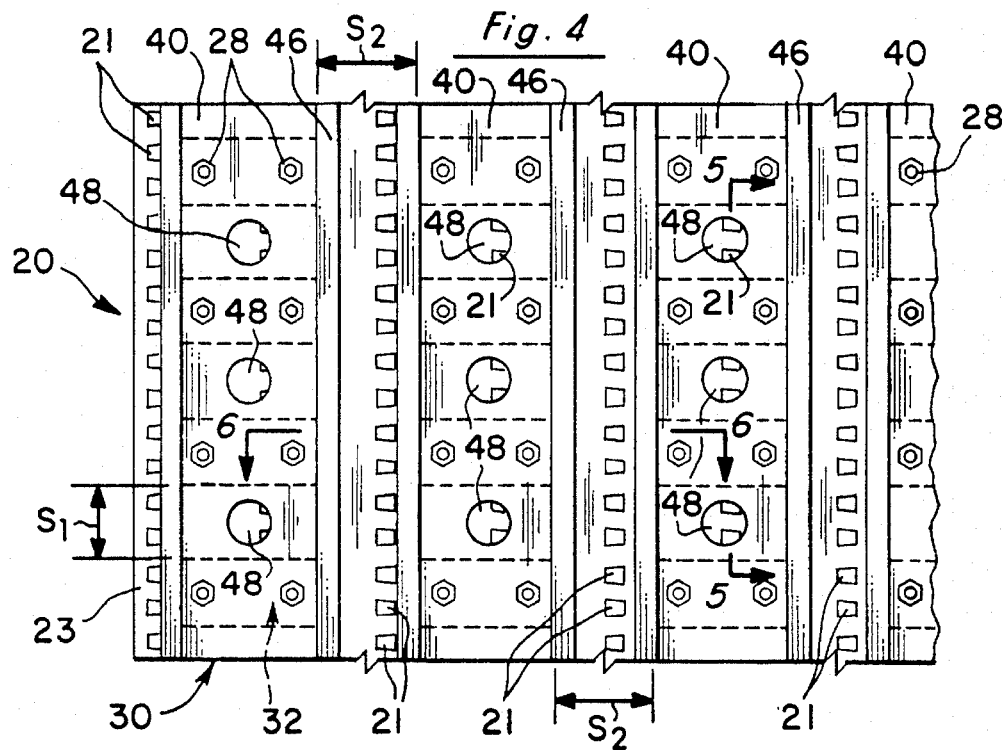
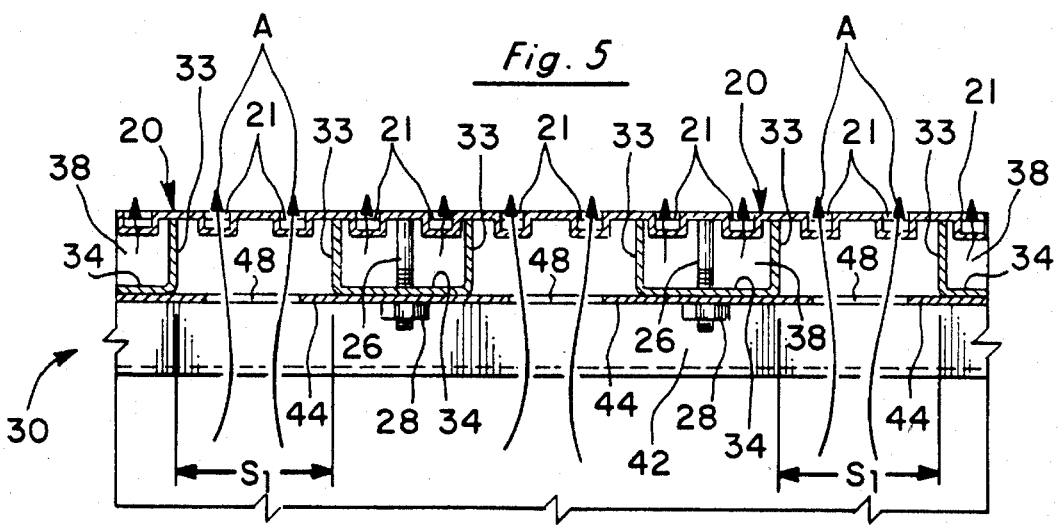
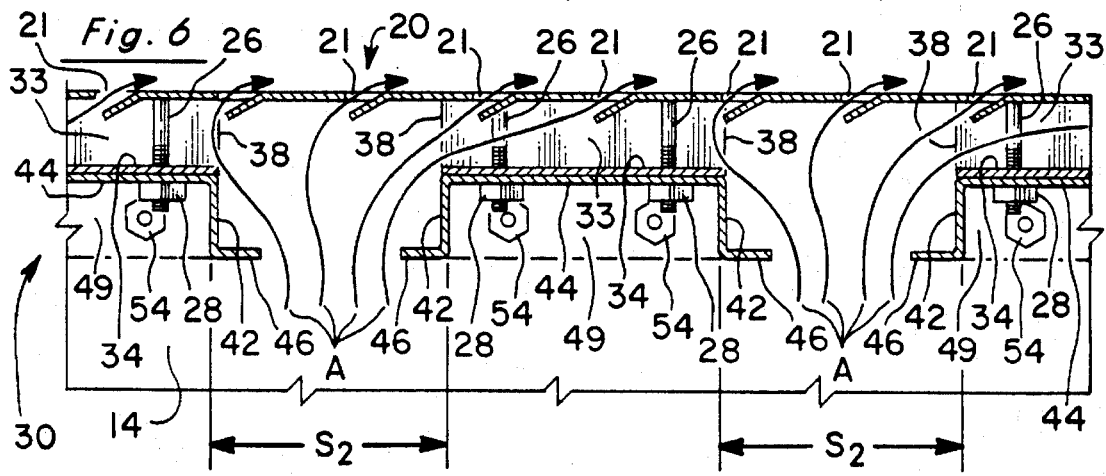

AIR CONVEYING SUPPORT STRUCTURE FOR CONVEYING ARTICLES ALONG AN AIR CONVEYOR

TECHNICAL FIELD

This invention relates to an improvement in an air conveying device and, more particularly, to a deck plate support structure for supporting the deck plate of an air conveyor.

BACKGROUND ART

In recent years, air conveyors have become popular for conveying lightweight articles, such as beverage containers and the like, both during the manufacturing of the containers and during filling operations. Such conveyors have enjoyed considerable success because they allow the containers to be conveyed at substantially higher speeds thus improving the overall efficiency of conveying such containers during various operations. These air conveyors utilize numerous types of structures to support and to secure the deck plate to the conveying apparatus.

Hilbish et al., U.S. Pat. No. 5,466,096, teach an air conveyor device with a plenum chamber having a perforated deck plate, side walls, and a hold down with holes of an area density sufficiently low to pressurize an enclosed article transport zone. The sidewalls include brackets for mounting doors which may be opened to remove damaged articles. The deck plate is mounted to cross supports by countersunk rivets.

Ingraham et al., U.S. Pat. No. 5,222,840, teach a double plenum air conveyor/accumulator. The conveyor has an elongated primary plenum and one or more elongated body members disposed over and in communication with the primary plenum through openings in a bottom wall of each body member. Each body member defines a secondary plenum between a top deck and the bottom wall. A plurality of cross members are employed to provide stiffening to the top deck of the conveyor.

Wiseman et al., U.S. Pat. No. 4,744,702, disclose a modular air conveyor construction comprising standardized side, bottom, and top walls adapted to be assembled together at the point of use, if so desired, to produce a conveyor section. The bottom and top walls can be provided in varying widths, and the side walls are configured to receive and hold the top and bottom walls. Further, the bottom and top walls may have brackets mounted thereon for attaching auxiliary elements such as guide rails or top covers, and to receive splice plates and other elements. The side walls are held together by means of spacers which may take the form of tie-rods. The tie-rods may be provided with a vertical support plate which engages the underside of the top wall to provide central support thereto.

Hassan et al., U.S. Pat. No. 4,165,132, disclose pneumatic control of the motion of objects suspended on an air film. This reference discloses a piece of air track including a plurality of manifolds which communicate with thin passages and which, in turn, communicate with objects to be conveyed by the pressure of air passing through the passages.

Sanders, U.S. Pat. No. 3,475,058, discloses a conveying apparatus including a support structure which forms first and second plenum chambers below a conveying surface.

The foregoing inventions are suitable for their intended purposes. However, in order to provide the required deck plate support for those conveyors which utilize deck plates having complex louver patterns, it is necessary to provide a support structure which provides continuous support to the deck plate both laterally across the deck plate and longitudinally along the length of the deck plate. This continuous support is necessary because deck plates having complex louver patterns are normally constructed of a relatively thin gauge metal, such as stainless steel, which can become warped or deformed when installed on an air conveying device. Additionally, the deck plate can become warped or deformed due to many external factors such as stresses produced on the deck plate due to moving the deck plate from one location to another, an uneven floor under the conveyor, or due to temperature changes. Also, when manufactured, the deck plate may not be completely planar which will result in the formation of bumps or undulations on the deck plate. Even the slightest imperfections in a deck plate which causes the deck plate to not be completely planar results in irregular and uncontrollable conveyance of articles thereupon. Therefore, it is imperative that the deck plate support structure provide the required continuous lateral and longitudinal support to overcome any imperfections in the shape of the deck plate.

Furthermore, the support structure must not unnecessarily restrict the flow of air through the louvers which communicate with the plenum of the deck plate. Restricted air flow on any portion of the deck plate results in irregular air pressures along the upper surface of the deck plate which, in turn, causes containers on the deck plate to not be conveyed in a controllable and uniform manner.

SUMMARY OF THE INVENTION

In accordance with the present invention, an air conveying device support structure for conveying articles along an air conveyor is provided. In its simplest form, the support structure includes a plurality of upper support members which are selectively placed along the underside of a deck plate, and a plurality of lower support members are provided which connect between the upper support members and connecting structure of the plenum.

More specifically, the lower support members extend laterally across the underside of the deck plate and are spaced longitudinally therealong. Opposite ends of the lower support members are attached to support bars which comprise the connecting structure of the plenum. The upper support members are attached and positioned between the underside of the deck plate and the lower support members. The upper support members extend longitudinally along the underside of the deck plate and are arranged in a plurality of laterally extending rows across the underside of the deck plate. As discussed below, the upper and lower support members may be arranged along the underside of the deck plate in virtually limitless combinations to provide the needed support to the deck plate.

A plurality of fasteners extends downwardly from the underside of the deck plate providing a means to attach the upper and lower support members to the underside.

The upper support members each include a pair of opposing side walls and a base member which results in the formation of a shape resembling a channel. Accordingly, a passageway is created between the opposing side walls which enables air to flow through the passageway and communicate directly with the openings or louvers of the deck plate located above the passageway. A plurality of slots are formed on each of the upper support members for receiving corresponding fasteners and which enables the upper support members to be selectively positioned along the underside of the deck plate.

The shape of the lower support members also resemble a channel-like member wherein a pair of opposed vertical extensions attach to an upper plate support. Each vertical extension may have attached thereto a flange which provides greater bending moment support to the lower support member when installed within the air conveying device. A plurality of holes are formed on the upper plate support and which align with the slots of the upper support members to receive corresponding fasteners. A plurality of openings may be formed on the upper plate support which enables pressurized air within the plenum to directly communicate with the louvers of the deck plate which are located thereabove.

In a preferred arrangement, there are a plurality of rows of upper support members extending laterally across the underside of the deck plate. In accordance with this preferred arrangement, each laterally extending row of upper support members attaches to a corresponding lower support member. Furthermore, the length of each upper support member may be sized to substantially equal the width of the corresponding lower support member over which each of the upper support members is positioned.

In accordance with another aspect of a preferred arrangement, each upper support member within a row of laterally extending upper support members is placed between each opening of the corresponding lower support member. This particular arrangement ensures that pressurized air flowing through the plenum of the air conveying device is capable of directly communicating with the openings or louvers of the deck plate with minimal interference by the upper and lower support members. That is, because pressurized air within the plenum may travel through the passageways formed by the sidewalls of the upper support members and the openings formed in the lower support members, uniform pressurized air is able to communicate directly with the openings or louvers of the deck plate.

Due to the arrangement of the upper and lower support members, continuous support is provided to the deck plate both laterally across and longitudinally therealong. As previously discussed, this continuous support is particularly critical for deck plates which have complex louver patterns and which may be made of a relatively thin gauge metal which may be slightly deformed when manufactured or subject to deformation when later installed. By use of the support structure described herein, the effects of existing imperfections in the deck plate and later caused imperfections can be minimized.

Because uniform air flow is critical in air conveyors utilizing complex louver patterns, it is another advantage of this invention that air flow may pass relatively unimpeded through the support structure and to the louvers of the deck plate. Furthermore, the minimal impedance created by the support structure results in the reduction in the amount of air flow required to convey articles and to overcome any residual irregular pressure areas which may exist along the upper surface of the conveyor surface.

Furthermore, the size and positioning of the side walls of the upper support members and the size, positioning, and shape of the openings formed in the lower support members may be adjusted to enable the pressurized air within the plenum to most advantageously flow through the louvers in the deck plate.

The slots formed in the upper support members and the arrangement of the upper support member with respect to the lower support member enables the support structure to be placed in virtually an infinite number of ways to accommodate the specific support structure requirements of a conveying apparatus.

Each of the foregoing advantages of this invention are achieved with a relatively simple structure which may be manufactured and installed at a minimum cost.

Additional advantages of this invention will become apparent from the description which follows, taken in conjunction with the accompanying drawings.

BRIEF DESCRIPTION OF THE DRAWINGS

FIG. 4 is a fragmentary plan view of the deck plate support structure, taken along Line 4—4 of FIG. 1, showing further details of the support structure;

FIG. 5 is an enlarged lateral section, taken along Line 5—5 of FIG. 4, illustrating the arrangement of the deck plate support structure and the flow of pressurized air from the plenum through the deck plate support structure and through the louvers of the deck plate; and FIG. 6 is an enlarged longitudinal section, taken along Line 6—6 of FIG. 4, illustrating the arrangement of the deck plate support structure and the flow of pressurized air from the plenum through the deck plate support structure and through the louvers of the deck plate.

BEST MODE FOR CARRYING OUT THE INVENTION

Figure 1:
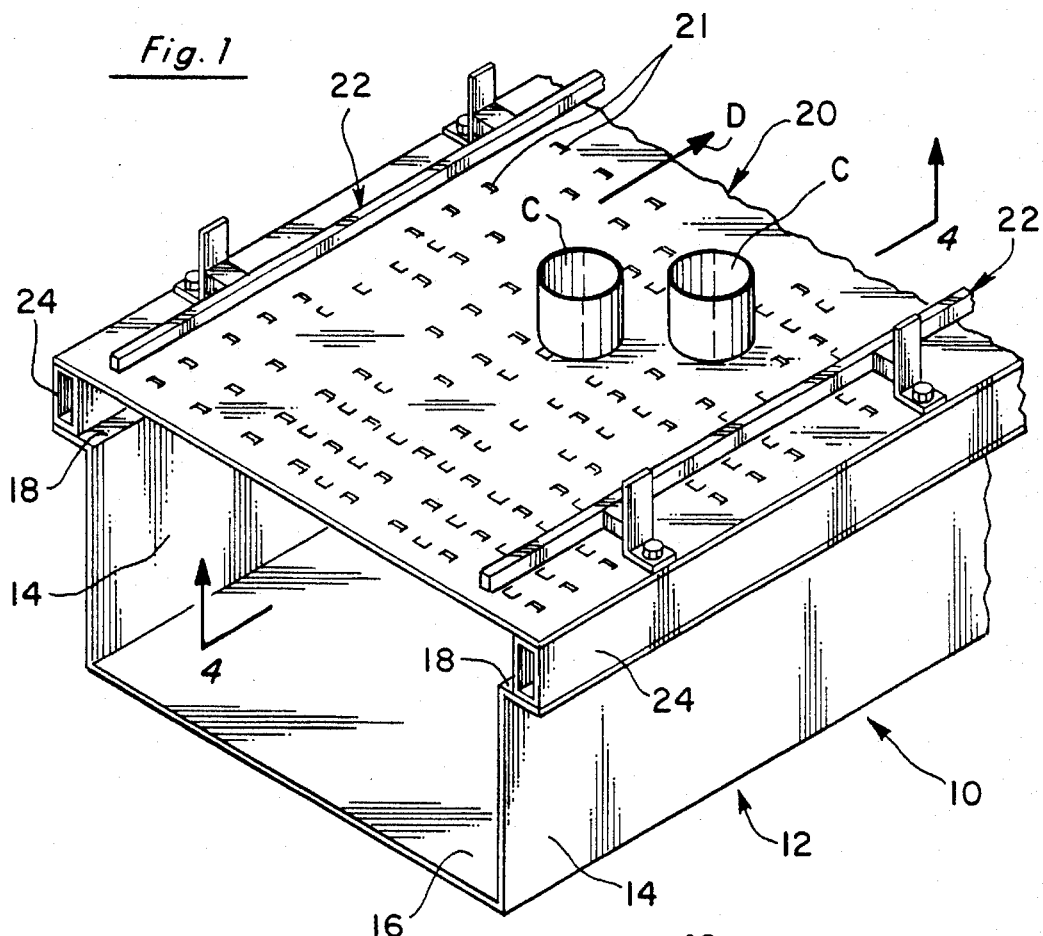
FIG. 1 is a downward looking fragmentary perspective view of a damperless air conveyor used to convey articles along a conveyor surface of a deck plate from an upstream location to a downstream location.

As shown in FIG. 1, a damperless air conveying device 10 is shown which may include a plenum assembly 12 comprising a pair of vertical sidewalls 14 interconnected by a bottom wall 16. The upper free ends of the vertical sidewalls 14 may each include an outwardly extending flange 18 upon which is mounted a corresponding support bar 24. A deck plate 20 including a plurality of openings such as louvers 21 is mounted upon the support bar 24. A side rail assembly 22 may be positioned along the opposite lateral edges of the deck plate 20 to help guide the containers C which are conveyed downstream along direction of travel D. As shown, air conveying device 10 is a mass conveying apparatus which may convey a plurality of containers C downstream along the deck plate 20. The louvers 21 are arranged upon the deck plate 20 to provide the necessary air flow therethrough to cause containers C to be conveyed downstream.

Figure 2:
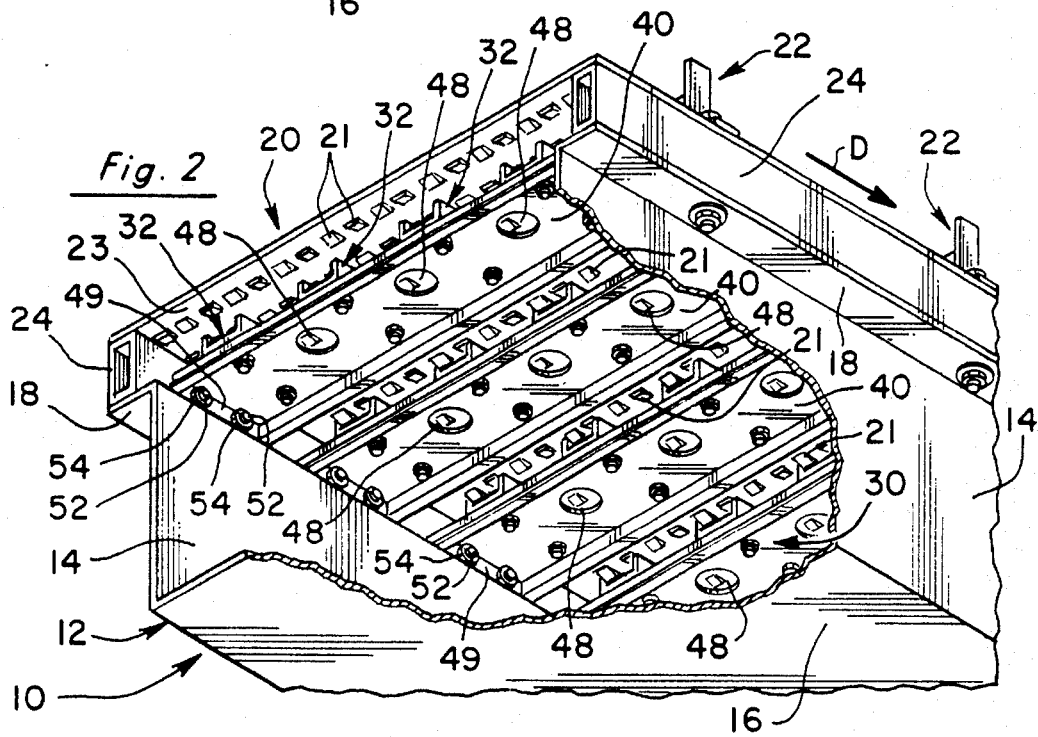
FIG. 2 is an upward looking fragmentary perspective view of the air conveying device support structure of this invention installed within the air conveyor illustrated in FIG. 1.
Figure 3:
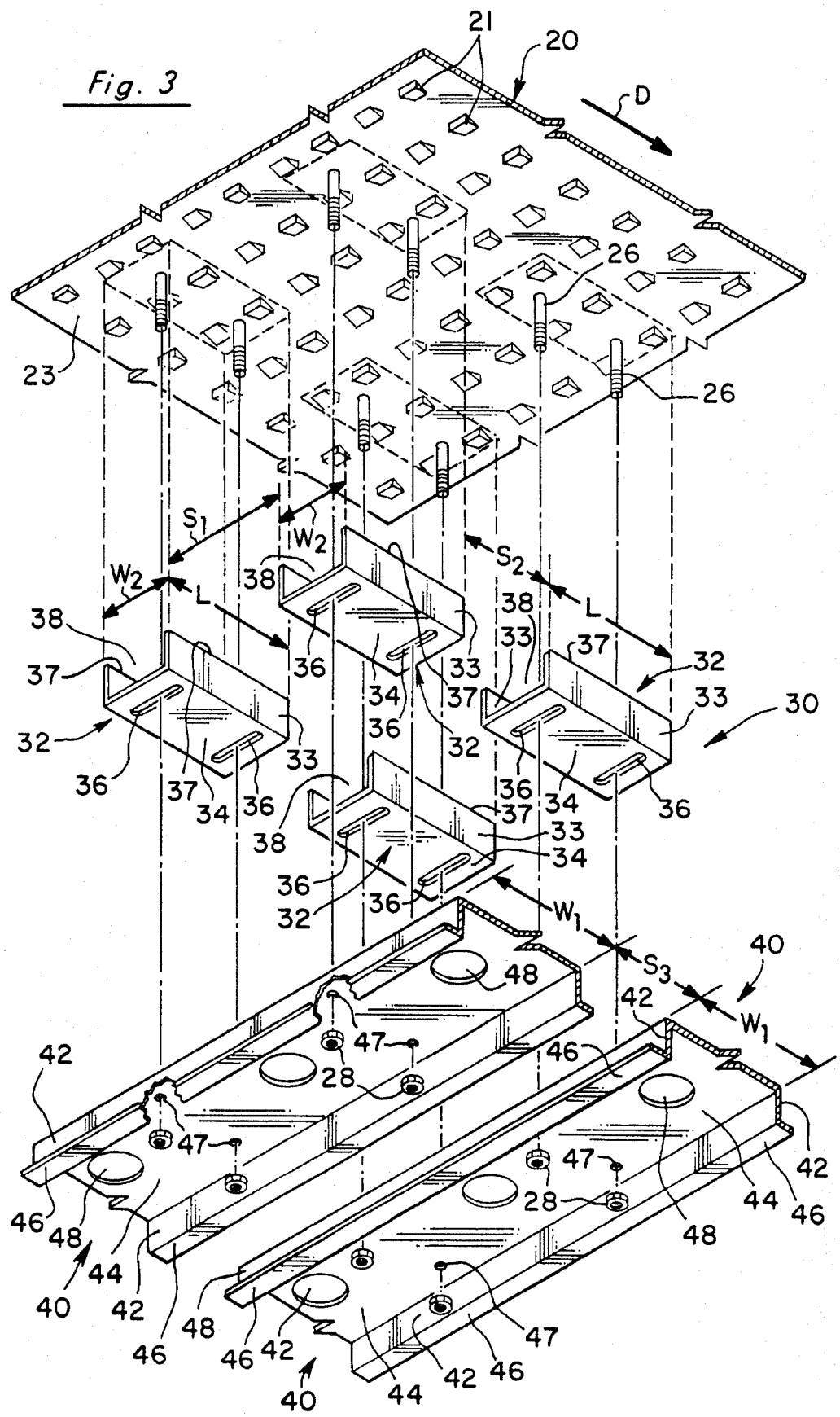
FIG. 3 is an upward looking fragmentary exploded perspective view of the deck plate support structure of this invention and its arrangement with respect to the underside of the deck plate.

As best seen in FIGS. 2 and 3, the deck plate support structure 30 is installed beneath the deck plate 20 and along the underside thereof between vertical sidewalls 14 and extending the length of the air conveying device 10. As best seen in FIG. 3, the deck plate support structure 30 may include two primary types of members, namely, upper support members 32 and lower support members 40. Upper support members 32 each includes a pair of opposing sidewalls 33 which are interconnected by a base 34. When installed, sidewalls 33 are substantially vertical and the free edges 37 of the sidewalls 33 make contact with the underside 23 of the deck plate 20. Because of the arrangement of sidewalls 33, a passageway 38 is formed therebetween which enables pressurized air within the plenum assembly 12 to pass unimpeded to louvers which are positioned directly above the corresponding passageway 38.

As shown in FIG. 3, the free edges 37 of the sidewall 33 are preferably placed adjacent to the louvers 21 so as not to directly cover any of the louvers 21 which would impede the air flow therethrough. However, depending upon the criticality of air flow in the particular conveyor, partially covering one or more louvers 21 by free edges 37 does not depart from the spirit and scope of this invention.

A plurality of slots 36 are formed in base 34 which enables the upper support members 32 to be placed at a desired location along the underside 23 of the deck plate 20. Although the figures illustrate slots 36 as traversing laterally across the deck plate, it will be understood by those skilled in the art that slots 36 may extend longitudinally along the deck plate 20 or at a diagonal angle with respect to the longitudinal direction of the deck plate 20 enabling the upper support members 32 to be selectively positioned at different locations.

Positioned below the upper support members 32 are the plurality of lower support members 40 which extend laterally across the conveyor surface 20 and are spaced longitudinally therealong. Lower support members 40 include a pair of vertical extensions 42 which are connected by an upper plate support 44. Attached to each vertical extension 42 is an outwardly extending flange 46 which provides additional bending moment support to the lower support member 40. A plurality of openings 48 are formed through the upper plate support 44. Although a generally circular opening is illustrated in FIG. 3, it will be understood that other sizes and shapes of openings may be incorporated to satisfy the particular air flow requirements through the openings to the louvers of the deck plate.

Upper support members 32 are connected to corresponding lower support members 40 by means of a plurality of fasteners 26, such as threaded bolts, which are attached to the underside 23 of deck plate 20. The free end of the fasteners 26 pass through the slots 36 in upper support members 32 and through holes 47 drilled in upper plate supports 44. A nut 28 may be threaded and tightened over a corresponding fastener 26 to rigidly secure the support structure 30 to the underside 23 of the deck plate 20.

As best seen in FIG. 2, each lower support member 40 includes an end plate 49 at each opposite end thereof which is connected to and extends perpendicularly away from upper plate support member 44 in the same manner as vertical extensions 42. End plates 49 are provided as a means of attachment for attaching the lower support members 40 to support bars 24. Accordingly, holes (not shown) may be drilled in end plates 49 through which a corresponding fastener 52 is inserted and secured thereto by a nut 54. Fastener 52 is attached to support bar 24 as is understood by those skilled in the art.

As best seen in FIG. 5, the flow of pressurized air A passes through the support structure 30 substantially unimpeded by flowing through openings 48 and then through those louvers 21 which are positioned thereabove. Also, as best seen in FIG. 6, the air flow A also passes substantially unimpeded through the support structure 30 by flowing through passageways 38 and then through those louvers 21 which are positioned thereabove. Of course, along those portions of the underside 23 of deck plate 20 which do not have positioned directly thereunder some element of the support structure 30, the pressurized air from the plenum assembly 12 is capable of directly flowing to those particular louvers 21.

As best seen in FIG. 3, the preferred arrangement of the upper support members 32 is such that the length L thereof is substantially the same as the width $W_1$ of lower support members 40. Accordingly, a lower support member 40 is placed directly underneath a laterally extending row of upper support members 32. The number of lower support members 40 is determined by the number of corresponding rows of upper support members 32.

Depending upon the support that is required to be provided to the conveyor surface 20, both the upper and lower support members may be spaced either closer together or farther apart. That is, as shown in FIG. 3, the spacing $S_1$ laterally between the upper support members 32 may be adjusted to accommodate such needs as well as the longitudinal spacing $S_2$ between rows of upper support members 32. As also illustrated in the preferred arrangement, the spacing $S_2$ also corresponds to the longitudinal spacing $S_3$ between lower support members 40.

Although the preferred arrangement of this invention illustrates the upper and lower support members being arranged in a specified manner, it will be understood by those skilled in the art that the number of upper and lower support members required as well as their spacing may be modified to accommodate the specific structural support needs of the deck plate. For example, instead of an upper support member 32 being spaced between each opening 48, the upper support members 32 could be arranged such that they only are positioned between alternating openings 48. Alternatively, it may be necessary to provide greater rigidity to the deck plate whereby more than one upper support member 32 may be placed between adjacent openings 48. Accordingly, the width $W_2$ of the upper support members 32 may be modified to accomplish such an alternate arrangement.

Although it is generally preferred to provide an opening 48 as large as possible to ensure that there is not unnecessary restriction of air flow through the louvers, in some circumstances, it may be necessary to either reduce the size of the openings 48 or to partially cover them by upper support members 32 in order to provide the adequate structural support to the deck plate. It is within the spirit and scope of this invention to include those other deck plate support structure arrangements wherein the upper support members 32 may either partially cover an opening 48 or wherein the sizes of openings 48 are modified to suit the particular application of the invention.

This invention has been described in detail with reference to particular embodiments thereof, but it will be understood that various other modifications can be effected within the spirit and scope of this invention.

It is claimed:

1. An air conveying device support structure for conveying articles from an upstream location to a downstream location, said air conveying device support structure comprising:

a deck plate having an upper surface, with a plurality of louvers therethrough, along which the articles are conveyed and an underside;

a plurality of upper support members selectively spaced laterally from each other across said underside of said deck plate and having a length extending longitudinally therealong, each of said upper support members having side walls defining a passageway extending a length therethrough, each said passageway communicating with said underside of said deck plate; and a plurality of lower support members attached to said plurality of upper support members and selectively spaced longitudinally along said underside of said deck plate and extending laterally thereacross, each of said lower support members including at least one opening which communicates with said underside of said deck plate;

wherein said upper support members are between said deck plate and said lower support members.

2. Apparatus, as claimed in claim 1, wherein:

said plurality of upper support members each includes at least one slot for selectively positioning each of said plurality of upper support members along said underside of said deck plate.

3. Apparatus, as claimed in claim 1, wherein:

said at least one opening of each of said lower support members is a plurality of openings spaced along a length of a corresponding one of said plurality of lower support members and positioned between said plurality of upper support members.

4. Apparatus, as claimed in claim 1, wherein:

said side walls are positionable in contact with said underside of said deck plate so that said plurality of louvers remain uncovered by the contact between said side walls and said underside.

5. Apparatus, as claimed in claim 1, wherein:

said length of each of said plurality of upper support members is equal to or less than a width of each of said plurality of lower support members.

6. Apparatus, as claimed in claim 1, wherein:

said deck plate further includes a plurality of fasteners connected to said underside thereof for attaching said plurality of upper and lower support members to said underside of said deck plate.

7. Apparatus, as claimed in claim 1, wherein:

said plurality of upper support members are arranged in a plurality of longitudinally spaced rows extending laterally across said underside of said deck plate and are positioned over corresponding ones of said plurality of lower support members.

8. Apparatus, as claimed in claim 1, wherein:

said upper support members are arranged in a plurality of longitudinally spaced rows extending laterally across said underside of said deck plate and are spaced longitudinally along said deck plate in equal correspondence to the longitudinal spacing of said plurality of lower support members.

9. An air conveying device support structure for conveying articles from an upstream location to a downstream location, said air conveying support structure comprising:

a deck plate having an upper surface, with a plurality of louvers therethrough, along which the articles are conveyed and an underside;

a plurality of first means for supporting said deck plate, said first supporting means being selectively spaced laterally across said underside of said deck plate from each other and having a length extending longitudinally therealong, each of said plurality of first supporting means having means for forming a passageway integral with a corresponding one of each of said plurality of first supporting means, each said passageway communicating with said underside of said deck plate; and a plurality of second means for supporting said deck plate attached to said plurality of first supporting means, said plurality of second supporting means being selectively spaced longitudinally along said underside of said deck plate and extending laterally thereacross, each of said plurality of second supporting means including at least one opening extending therethrough, each said at least one opening communicating with said underside of said deck plate;

wherein said plurality of first supporting means is between said deck plate and said plurality of second supporting means.

10. Apparatus, as claimed in claim 9, wherein:

said plurality of first supporting means each includes at least one slot for selectively positioning of each of said plurality of first supporting means along said underside of said deck plate.

11. Apparatus, as claimed in claim 9, wherein:

each said at least one opening is a plurality of openings spaced along a length of a corresponding one of each of said plurality of second supporting means and positioned between said plurality of first support means.

12. Apparatus, as claimed in claim 9, wherein:

said forming means are positionable in contact with said underside of said deck plate so that said plurality of louvers remain uncovered by the contact between said forming means and said underside.

13. Apparatus, as claimed in claim 9, wherein:

said length of each of said plurality of first supporting means is equal to or less than a width of each of said plurality of second supporting means.

14. Apparatus, as claimed in claim 9, wherein:

each of said plurality of first supporting means is positioned over a corresponding one of said plurality of second supporting means.

15. Apparatus, as claimed in claim 9, wherein:

said deck plate further includes a plurality of fasteners connected to said underside thereof for attaching said plurality of first and second supporting means to said underside of said deck plate.

* * * * *